W. H. HOLMES.
HORSESHOER'S JACK.
APPLICATION FILED SEPT. 25, 1914.

1,146,163.

Patented July 13, 1915.

Witnesses:
L. B. Graham
C. H. Seem

Inventor:
William H. Holmes
By Brown, Nissen & Sprinkle
Att'ys.

UNITED STATES PATENT OFFICE.

WILLIAM H. HOLMES, OF CHICAGO, ILLINOIS.

HORSESHOER'S JACK.

1,146,163.  Specification of Letters Patent.  Patented July 13, 1915.

Application filed September 25, 1914. Serial No. 863,583.

*To all whom it may concern:*

Be it known that I, WILLIAM H. HOLMES, a citizen of the United States, residing at Chicago, in the county of Cook and State of Illinois, have invented a new and useful Improvement in Horseshoers' Jacks, of which the following is a specification.

My invention relates to horseshoers' jacks and has for its object the provision of a simple and efficient device of the character mentioned which is rigidly constructed and of a form permitting an operator, without interfering with his work, to firmly hold it while in use.

Other objects will appear hereinafter.

The invention consists in substantially the combination and arrangement of parts hereinafter described and claimed, and will be best understood by referring to the accompanying drawing, in which—

Figure 1:
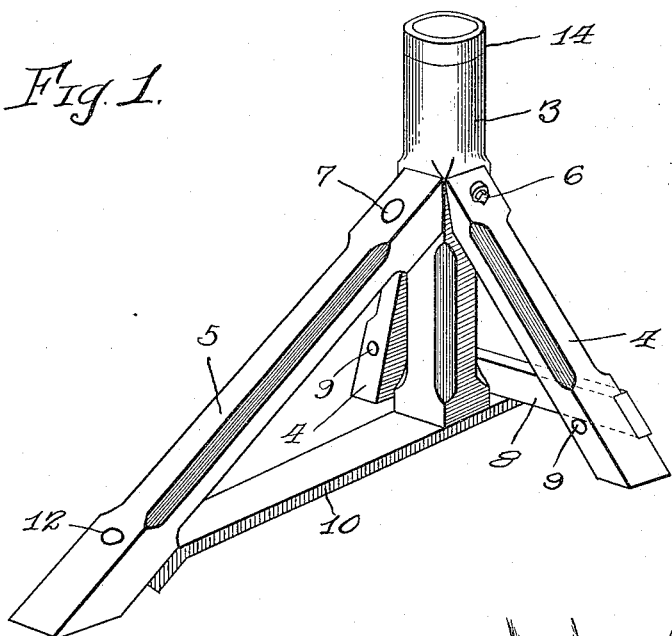
Figure 2:
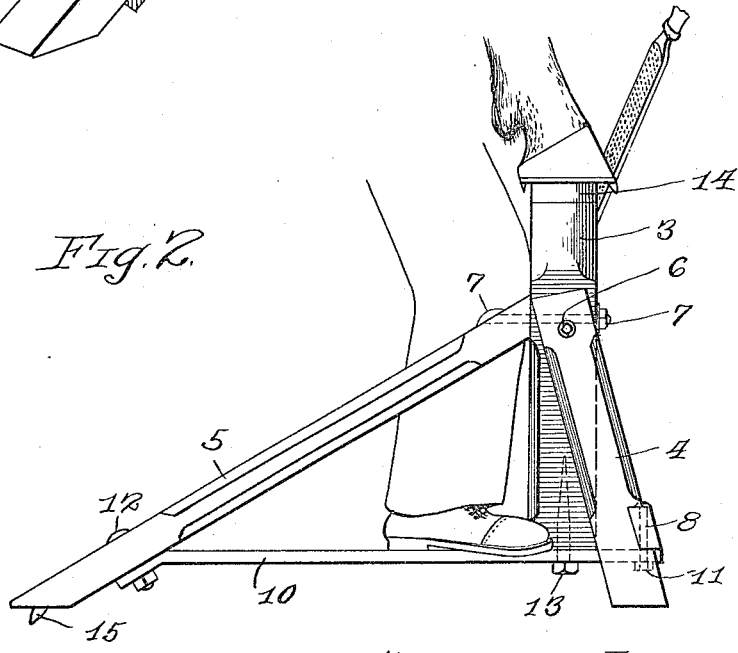

Figure 1 is a perspective view of a horseshoer's jack embodying my invention, and Fig. 2 is a side elevation of my device showing its application in use.

Referring to the drawing more specifically the invention comprises a substantially vertical post 3 supported by two legs 4, similar in length and in the manner in which they are attached to the post, and an inclined leg 5 which is longer than legs 4. The upper end of each of the legs is rigidly secured to the post in any desired manner, the manner shown being a bolt 6 passing through the upper ends of legs 4 and post 3 to secure the legs 4 to the post and a bolt 7 passing through the upper end of leg 5 and post 3 securing the leg 5 to the post. The lower portions of legs 4 are rigidly spaced apart by a bar 8 which is secured to the legs in any suitable manner such as by bolts 9. A bar 10 has one of its ends secured to the bar 8, preferably at the central portion of bar 8 and at the under side thereof, by means of a bolt 11, or other desired fastener. The other end of bar 10 is secured to the lower portion of leg 5 by means of a bolt 12, the bar 10 being disposed horizontally and in a position slightly above the ground or other support upon which the device may rest. The bottom of post 3 is secured, by means of a lag screw 13, or its equivalent, to the bar 10, the construction being such that the bars 8 and 11 rigidly space the bottom ends of the legs apart and firmly hold the lower end of post 3 in its position between the bottoms of the legs. At the top of post 3 I provide a ferrule 14 to prevent excessive wear and damage through use of the top of the post. However, the ferrule 14 may be dispensed with and any other means employed for preserving the top of the post.

The device is designed for use in the operation of applying horseshoes to horses or other hoofed animals and is preferably placed so that the leg 5, which is longer than legs 4, will be disposed alongside of or under the animal with the foot of such animal on the top of post 3 as indicated in Fig. 2. When the animal's foot is raised, as indicated in Fig. 2, the tendency of the animal is to draw its foot downwardly in the direction of leg 5 of the device, therefore leg 5 of the device is made considerably longer than the other legs in order to bring the center of the weight and the pull of the horse on the top end of the post as far as possible from the lower end of said leg 5.

To facilitate holding the device in position a projection 15 is provided in the lower end of leg 5 and is adapted to engage the floor or other object upon which the device is resting to prevent slipping of the latter. An operator may also place his foot on bar 10 with his knee resting against post 3 in one of the corners between the top ends of leg 5 and one of the legs 4 in order to facilitate holding the device against movement by the horse. When in the position indicated in Fig. 2, the operator's foot on bar 10 is very near the ground and his knee almost straight so that he will be substantially free to make all necessary movements and still firmly hold the device in position.

The particular disposition of the operator's foot and knee on the device also greatly assists such operator in preventing side movements, *i. e.*, movements in the directions of the legs 4, of the device which might be caused through the exertions of the horse.

By securing the upper portion of the post 3 rigidly between the top ends of the legs and rigidly connecting the bottom of such post to rigid bars which space the bottom of the legs apart, a construction is provided which is very strong and one in which the center of the load or strain on the device is brought very low in the device. This arrangement also facilitates maintaining the device in upright position with very little exertion by the operator.

While I have illustrated and described the preferred form of construction of my invention I do not desire to be limited to the precise details shown but desire to avail myself of such variations as come within the scope of the appended claims.

What I claim is:

1. A horseshoer's jack comprising a substantially vertical post having its top arranged for supporting a horse's hoof; supporting legs secured at their upper ends to said post; a bar connecting two of said legs at points near the lower ends thereof; and a bar connected at one end to the central part of said first mentioned bar and at its other end to the lower portion of another of the legs, the bottom of said post being secured to said second mentioned bar.

2. A horse-shoer's jack, comprising a vertical post having its top arranged to support a horse's foot; three supporting legs connected at their upper ends to the upper portion of the post and disposed at angles to the latter; two of said legs being of equal length and the other leg being considerably longer and disposed at a greater angle to the post than the other legs; a bar connecting the two shorter legs together at their lower portions; and a bar connecting the central portion of said first mentioned bar and the lower portion of the longer leg, the bottom of the post being secured to the said second-mentioned bar and all of said parts being adapted to permit an operator to hold the device in position upon placing his foot on said second-mentioned bar and against the lower portion of the post, and his knee in the corner between the upper ends of one of the shorter legs and the longer leg and the upper portion of the post.

In testimony whereof I have signed my name to this specification, in the presence of two subscribing witnesses, on this 23d day of September, A. D. 1914.

WILLIAM H. HOLMES.

Witnesses:
CHARLES H. SEEM,
THOMAS COLSON.